United States Patent Office 3,347,694
Patented Oct. 17, 1967

3,347,694
METHOD FOR OPTICAL BRIGHTENING OF POLYMERIC SUBSTRATES UTILIZING 2-STYRYLOXAZOLE COMPOUNDS
Ichiro Okubo and Michihiro Tsujimoto, Tokyo, Japan, assignors to Mitsui Kagaku Kogyo Kabushiki Kaisha, Tokyo, Japan
No Drawing. Original application Aug. 31, 1962, Ser. No. 220,904, now Patent No. 3,262,929, dated July 26, 1966. Divided and this application Oct. 22, 1965, Ser. No. 502,414
Claims priority, application Japan, Sept. 12, 1961, 36/33,302, 36/33,303; July 21, 1962, 37/29,641
21 Claims. (Cl. 117—33.5)

ABSTRACT OF THE DISCLOSURE

This invention relates to methods for optical brightening utilizing certain novel 2-styryloxazole compounds. The methods are particularly applicable to organic fibrous materials, especially of synthetic nature, aqueous dispersions of the compounds, together with dispersing aids being suitable. The said compounds may be either benzoxazoles or napthoxazoles and various substituents may be present in their molecular structures. Some of the compounds are found to be especially superior and certain fibrous materials are notably benefited.

---

This application is a division of our prior application Ser. No. 220,904, now Patent No. 3,262,929.

This invention relates to methods of optical brightening utilizing novel 2-styryloxazole compounds.

It is an object of this invention to provide new and useful methods for optical brightening of organic fibrous materials.

The novel 2-styryloxazole compounds of this invention have the structure represented by the general formula:

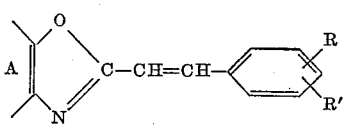

wherein A is a member selected from the group consisting of substituted benzene rings and unsubstituted naphthalene ring, which is condensed with the oxazole ring, substitutes of said benzene rings being selected from the group consisting of alkyl-, aryl-, and alkylene-groups, and R and R' are selected from hydrogen, halogen, cyano group, carboxyl group and its ester residue, alkyl group and aryl group.

2-styryloxazole compounds were little known in the past, although, for example, 2-styrylbenzoxazole and 2-(4'-dimethylaminostyryl)-benzoxazole were found (D. M. Brown, A. R. Kon, J. Chem. Soc., 1948, 2147).

The present inventors have synthesized a number of 2-styryloxazole compounds to study precisely on their properties, and have found that the novel 2-styryloxazole compounds having the general Formula I exhibit a strong fluorescence and produce an excellent optical brightening effect when organic fibrous materials are treated with these novel compounds. That is, the novel 2-styryloxazole compounds are very useful substances as the optical brightening agent for organic fibrous materials, particularly various man-made fibers, and light-fastness is excellent.

The novel 2-styryloxazole compounds of this invention can be prepared by condensation under dehydration of a 2-methyloxazole compound represented by the following general formula:

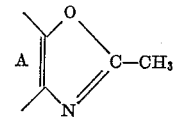

(wherein A is the same as that in the general Formula I), with a benzaldehyde derivative represented by the following general formula:

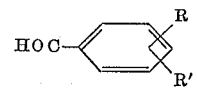

(wherein R and R' are the same as those in the general Formula I).

Alternatively the compounds of this invention can be prepared by intra-molecular ring closure under dehydration of a novel cinnamic acid-(O-oxyaryl)-amide derivative represented by general formula:

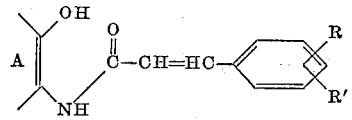

(wherein A, R and R' are the same as those in the general Formula I).

The following compounds can be cited as examples of 2-methyloxazole compound of the general Formula II among the starting materials employed for preparing the novel 2-styryloxazole compounds of this invention:

2-methylbenzoxazole
2,5-dimethylbenzoxazole
2,5,7-trimethylbenzoxazole
2-methyl-4,5-cyclotetramethylenebenzoxazole
2-methyl-5-ethylbenzoxazole
2-methyl-5-isopropylbenzoxazole
2-methyl-5-tert-butylbenzoxazole
2-methyl-5-phenylbenzoxazole
2-methyl-5-acetylaminobenzoxazole
2-methyl-α-naphthoxazole
2-methyl-β-naphthoxazole and the like.

And also the following compounds can be cited as examples of benzaldehyde derivative of the general Formula III among the starting materials:

benzaldehyde
2-chlorobenzaldehyde
3-chlorobenzaldehyde
4-chlorobenzaldehyde
4-bromobenzaldehyde
4-fluorobenzaldehyde
2-cyanobenzaldehyde
3-cyanobenzaldehyde
4-cyanobenzaldehyde
4-methylbenzaldehyde
4-phenylbenzaldehyde
4-cyano-2-chlorobenzaldehyde
4-cyano-3-chlorobenzaldehyde
4-carboxylbenzaldehyde
4-carboethyoxybenzaldehyde
2-chloro-4-carboxybenzaldehyde
3-chloro-4-carboxybenzaldehyde and the like.

The condensation reaction under dehydration of 2-methyloxazole compound of the general Formula II with benzaldehyde derivative of the general Formula III can be carried out by taking the both starting materials at about equal molar ratio and heating at 150°–200° C. by adding or not adding a dehydrating agent.

Among the starting material, cinnamic acid-(O-oxyaryl)-amide derivative can be easily obtained by N-acylating O-aminophenols or O-aminonaphthols, for example, 4-methyl-2-aminophenol
4,6-dimethyl-2-aminophenol
4-ethyl-2-aminophenol
4-phenyl-2-aminophenol
1-amino-2-naphthol
2-amino-1-naphthol and the like, or their inorganic acid salts with cinnamic acid halogenide, for example, cinnamic acid chloride
3-chlorocinnamic acid chloride
4-chlorocinnamic acid chloride
4-cyano-3-chlorocinnamic acid chloride according to a conventional method. The intra-molecular ring closure reaction under dehydration of cinnamic acid-(O-oxyaryl)-amide thus obtained can be carried out in an inert organic solvent such as xylene, chlorobenzene, dichlorobenzene and the like by adding a dehydrating agent and causing a reaction by heating.

The examples of novel 2-styryloxazole compounds of this invention are shown in Table 1.

TABLE 1

| No. | Structural Formula | Property and melting point | Fluorescence in benzene solution |
|---|---|---|---|
| 1 | (benzoxazole with CH3, C-CH=HC-C6H4-Cl) | Colorless needle-like crystals, 154–155° C. | Violet. |
| 2 | (benzoxazole with H3C, C-CH=HC-C6H4-CN) | Light yellow pillar-like crystals, 196–197° C. | Do. |
| 3 | (benzoxazole with H3C, C-CH=HC-C6H4-C6H5) | Slightly yellow plate crystals, 146–147° C. | Do. |
| 4 | (benzoxazole with H3C, C-CH=HC-C6H4-COOH) | Light yellow pillar-like crystals, >310° C. | Do. |
| 5 | (benzoxazole with H3C, C-CH=HC-C6H4-COOC2H5) | Colorless needle-like crystals, 141–142° C. | Do. |
| 6 | (benzoxazole with H3C, C-CH=HC-C6H3(Cl)-CN) | Light yellow needle-like crystals, 221° C. | Do. |
| 7 | (benzoxazole with H5C2, C-CH=HC-C6H3(Cl)-CN) | Light yellow needle-like crystals, 155–156° C. | Do. |
| 8 | (benzoxazole with H3C, C-CH=HC-C6H3(Cl)-COOH) | Light yellow needle-like crystals, 260–268° C. | Blue. |
| 9 | (benzoxazole with CH3, H3C, C-CH=HC-C6H4-CN) | Slightly yellow needle-like crystals, 207–209° C. | Blue-violet. |
| 10 | (phenyl-substituted benzoxazole, C-CH=HC-C6H5) | Silver-white flake-like crystals, 134–136° C. | Violet. |

TABLE 1—Continued

| No. | Structural Formula | Property and melting point | Fluorescence in benzene solution |
|---|---|---|---|
| 11 | (benzoxazole with phenyl)—C—CH=HC—C₆H₄—CN | Light yellow needle-like crystals, 184–185° C. | Blue-violet. |
| 12 | (CH₃)₃C-benzoxazole—C—CH=HC—C₆H₄—COOH | Light yellow pillar-like crystals, 295–297° C. | Do. |
| 13 | naphthoxazole—C—CH=HC—C₆H₄—CN | Colorless flake-like crystals, 175–176°C. | Violet-blue. |
| 14 | naphthoxazole—C—CH=HC—C₆H₅ | Colorless flake-like crystals, 124–125° C. | Blue-violet. |
| 15 | naphthoxazole—C—CH=HC—C₆H₄—Cl | Slightly yellow pillar-like crystals, 134–135° C. | Blue. |
| 16 | naphthoxazole isomer—C—CH=HC—C₆H₅ | Light yellow pillar-like crystals, 122–123° C. | Green-blue. |
| 17 | naphthoxazole—C—CH=HC—C₆H₄—Cl | Slightly yellow needle-like crystals, 158–159° C. | Blue-green. |
| 18 | naphthoxazole—C—CH=HC—C₆H₄—Cl | Light yellow flake-like crystals, 114–115° C. | Blue. |
| 19 | naphthoxazole—C—CH=HC—C₆H₄—Cl | Yellow needle-like crystals, 159–160° C. | Green-blue. |

TABLE 1—Continued

| No. | Structural Formula | Property and melting point | Fluorescence in benzene solution |
|---|---|---|---|
| 20 | [naphthoxazole]-C-CH=HC-[phenyl]-F | Light yellow pillar-like crystals, 125–126° C. | Violet-blue. |
| 21 | [naphthoxazole]-C-CH=HC-[phenyl]-Br | Greenish yellow pillar-like crystals, 185–186° C. | Blue-green. |
| 22 | [naphthoxazole]-C-CH=HC-[phenyl]-CH₃ | Light yellow flake-like crystals, 123–124° C. | Violet-blue. |
| 23 | [naphthoxazole]-C-CH=HC-[phenyl]-COOH | Yellow long flake-like crystals, >300° C. | Blue. |

As shown in Table 1, the novel 2-styryloxazole compounds of this invention have fluorescence of blue violet to violet, and also show excellent affinity to organic fibrous materials from its aqueous dispersed system so that they are very useful for optical brightening of man-made fibers, particularly polyester, polyacrylonitrile, polyamide, acetalized polyvinyl alcohol, polyolefin and cellulose acetate fibers and their light fastness is remarkable. For example, the compound No. 18 in Table 1 is made into aqueous dispersed system by using anionic surface active agent of alkylbenzene sulfonic acid type, and when the above-mentioned man-made fibers are treated in a treating bath which is prepared in such a way as the amount of this compound is 0.1% or 0.2% to the material to be treated, an excellent optical brightening effect can be obtained. The treating conditions and the light fastness (according to JIS L 1045–1959, xenon light source) of man-made fibers in this case are shown in Table 2.

TABLE 2

| Fiber Materials | Compound concentration percent | Treatment temperature (° C.) | Treatment times (min.) | Light fastness |
|---|---|---|---|---|
| Polyester | 0.2 | 120 | 45 | 4 |
| Polyacrylonitrile | 0.1 | 100 | 45 | 3 |
| Polyamide | 0.1 | 80 | 45 | 3 |
| Celluloseacetate | 0.1 | 80 | 45 | 3–4 |
| Acetalized polyvinyl alcohol | 0.1 | 80 | 45 | 3 |
| Polypropylene | 0.1 | 100 | 45 | 2–3 |

It is convenient to use a composition which is previously mixed with a surface active agent in order to treat organic fibrous materials by using the compound of this invention. For example, a composition comprising 10 parts of 2-styryloxazole compound of this invention, 10 parts of surface active agent of alkyl benzene sulfonic acid type and 80 parts of formaldehyde condensate of naphthalene sulfonic acid can be conveniently used.

The process for preparing 2-styryloxazole compounds of this invention and the method of optical brightening of organic fibrous materials by using such compounds are illustrated by the following examples. Percents and parts herein are by weight.

EXAMPLE 1

2,5-dimethylbenzoxazole (14.7 parts), 4-carboxybenzaldehyde (15 parts) and zinc chloride (5 parts) are thoroughly mixed and are caused to react at 160–200° C. for 8 hours with stirring. The reactants are boiled and dissolved in methanol of 10 times volume. On cooling the methanol solution, 5-methyl-2-(4-carboxystyryl)-benzoxazole is precipitated as yellow crystals. When crystallized from ethanol containing glacial acetic acid, light yellow pillar-like crystals (M.P. >310° C.) are obtained.

EXAMPLE 2

2,5 - dimethylbenzoxazole (14.7 parts), 4 - cyano - 3 - chlorobenzaldehyde (18 parts) and zinc bromide (13 parts) are thoroughly mixed and are caused to reaction at 160° C. for 6 hours with stirring. In this case the water formed by the reaction is successively driven out of the reaction system. The reactants are boiled and dissolved in 50 parts of methanol. On cooling the methanol solution, 5 - methyl-2-(4′-cyano-3′-chlorostyryl)-benzoxazole is precipitated as yellow crystals. When recrystallized from dimethyl formamide, light yellow needle-like crystals (M.P. 221° C.) are obtained.

EXAMPLE 3

2,5,7 - trimethylbenzoxazole (16.1 parts), 4 - cyanobenzaldehyde (13.1 parts) and zinc chloride (7 parts) are mixed thoroughly and are caused to react at 160–200° C. for 8 hours with stirring while the formed water is successively taken out of the reaction system. Then, the reactants are subjected to steam distillation and unreacted starting materials are distilled out. The distillation residue is treated with hot xylene and the resulting xylene solution is allowed to cool to precipitate 5,7-dimethyl-2-(4'-cyanostyryl)-benzoxazole as yellow needle-like crystals. When recrystallized from ligroin containing benzene, slightly yellow needle-like crystals (M.P. 207–209° C.) are obtained.

EXAMPLE 4

2-methyl-α-naphthoxazole (18.3 parts), benzaldehyde (11 parts) and zinc chloride (7 parts) are thoroughly mixed and are caused to react at 160–200° C. for 8 hours with stirring. To the reaction product is added methanol of 3 times volume at hot state and after cooling the precipitate is filtered out. The precipitate is recrystallized from a mixture of ethanol and glacial acetic acid to give light yellow pillar-like crystals (M.P. >300° C.). This one is a double salt of 2-styryl-α-naphthoxazole and zinc chloride. On heating with water, 2-styryl-α-naphthoxazole is easily separated. Recrystallization from ligroin gives colorless needle-like crystals (M.P. 124–125° C.).

EXAMPLE 5

2-methyl-β-naphthoxazole (28 parts), 3-chlorobenzaldehyde (22 parts) and zinc chloride (10 parts) are mixed and are caused to react at 160–165° C. for 6 hours while the formed water is successively taken out of the reaction system. The reactants are dissolved in 150 parts of isopropanol. The isopropanol solution is allowed to cool to precipitate 2-(3'-chlorostyryl)-β-naphthoxazole as yellow crystals. Recrystallization from methanol gives light yellow flake-like crystals (M.P. 114–115° C.).

EXAMPLE 6

Cinnamic acid - (2'-oxynaphthyl-1') - amide obtained from 1-amino-2-naphthol hydrochloric acid salt (20 parts) and cinnamic acid chloride (17 parts) is boiled with 10 parts of phosphor oxychloride in 50 parts of O-dichlorobenzene for 8 hours while water formed by the reaction is successively distilled out of the system. Then, O-dichlorobenzene is taken out by steam distillation and the distillation residue is treated with ligroin. The ligroin solution is allowed to cool to precipitate 2-styryl-β-naphthoxazole as yellow crystals. Recrystallization from ligroin gives light yellow pillar-like crystals (M.P. 121.5–123° C.).

EXAMPLE 7

One part of 2 - (4'-cyanostyryl)-5,7-dimethylbenzoxazole of the following formula:

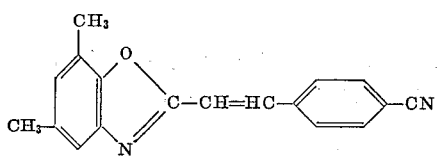

is thoroughly mixed with 9 parts of surface active agent of alkylbenzene sulfonic acid type to give a sample, and 0.2 part of the sample thus prepared per 10 parts of the polyester cloth to be treated is put into 400 parts of water to give a dispersed system. In this dispersed system the polyester cloth is treated at 120° C. for 45 minutes. The treated cloth is washed with water and dried to give the remarkable brightening effect as compared with non-treated cloth.

What is claimed is:
1. A method for optical brightening of soild polymeric materials comprising treating said materials with an oxazole compound of the formula

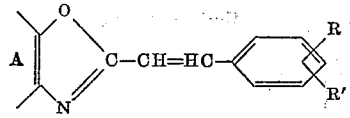

wherein A is a member selected from the group consisting of substituted benzene rings and an unsubstituted naphthalene ring, A being condensed with the oxazole ring, substituents of said benzene rings being selected from the group consisting of alkyl-, aryl-, and alkylene-groups, and, when A is said unsubstituted naphthalene ring, R and R' are selected from hydrogen, halogen, cyano group, carboxyl group and its ester residue, alkyl group and aryl group, R being a cyano group when A is said benzene ring with R' being selected as aforesaid, said treating being effected by contacting the said materials with an aqueous dispersion containing said oxazole in an amount sufficient to impart optical brightening effects to the material undergoing treatment.

2. A method as claimed in claim 1 wherein A of said formula is a benzene ring having at least one alkyl group as the substituent.

3. A method as claimed in claim 1 wherein the said compound is 5-methyl-2-(3'-chloro-4'cyanostyryl)-benzoxazole having the formula:

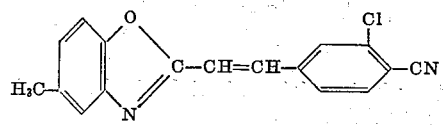

4. A method as claimed in claim 1 wherein the said compound is 5,7-dimethyl-2-(3'-chloro-4'-cyanostyryl)-benzoxazole having the formula:

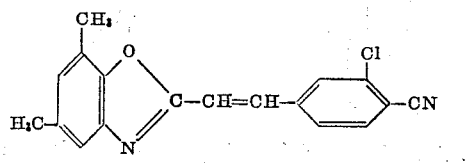

5. A method as claimed in claim 1 wherein the said compound is 5-ethyl-2-(3'-chloro-4'-cyanostyryl)-benzoxazole having the formula:

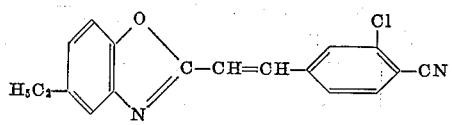

6. A method as claimed in claim 1 wherein the said compound is 5-methyl-2-(4'-cyanostyryl)-benzoxazole having the formula:

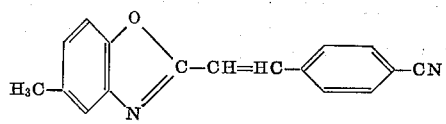

7. A method as claimed in claim 1 wherein the said compound is 5-methyl-2-(4'-carboxyethoxystyryl)-benzoxazole having the formula:

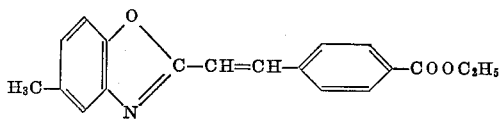

8. A method as claimed in claim 1 wherein A is a naphthalene ring.

9. A method as claimed in claim 1 wherein said compound is 2-(3'-chlorostyryl)-β-naphthoxoazole having the formula:

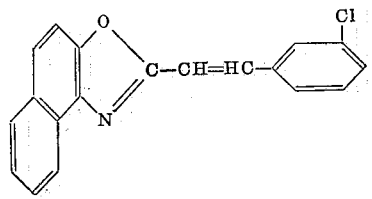

10. A method as claimed in claim 1 wherein said compound is 2-(4'-chlorostyryl)-β-naphthoxazole having the formula:

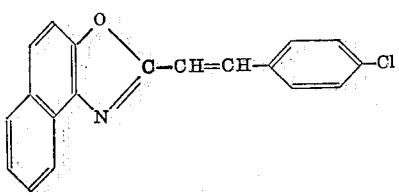

11. A method as claimed in claim 1 wherein said compound is 2-(3'-chlorostyryl)α-naphthoxazole having the formula:

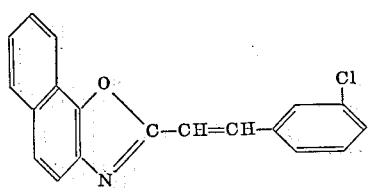

12. A method as claimed in claim 1 wherein said compound is 2-(2'-chlorostyryl)-α-naphthoxazole having the formula:

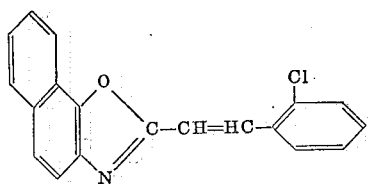

13. A method as claimed in claim 1 wherein said compound is 2-(4'-fluorostyryl)-β-naphthoxazole having the formula:

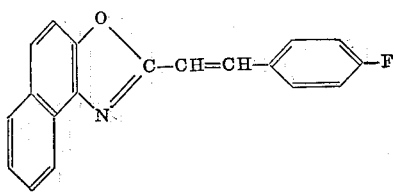

14. A method as claimed in claim 1 wherein A of said formula is a benzene ring having an alkylene group as the substituent.

15. A method as claimed in claim 1 wherein said compound is 4,5-cyclotetramethylene-2-(4'-cyanostyryl)-benzoxazole having the formula:

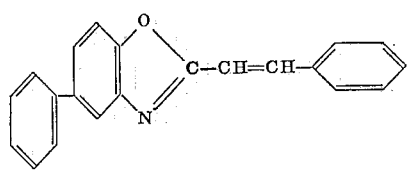

16. A method as claimed in claim 1 wherein A is a benzene ring having an aryl group as the substituent.

17. A method as claimed in claim 1 wherein said compound is 5-phenyl-2-(4'-cyanostyryl)-benzoxazole having the formula:

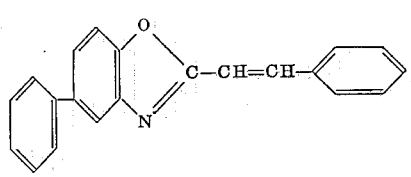

18. A method as claimed in claim 1 wherein said compound is 5-phenyl-2-styrylbenzoxazole having the formula:

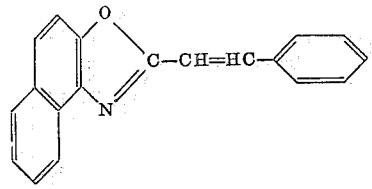

19. A method as claimed in claim 1 wherein said compound is 2-styryl-β-naphthoxazole having the formula:

20. A method as claimed in claim 1 wherein said material is an organic fibrous material.

21. A method for optical brightening as claimed in claim 1 wherein the material treated is selected from the group consisting of polyester fiber, polyacrylonitrile fiber, polyamide fiber, acetalized polyvinyl alcohol fiber, cellulose acetate fiber, and polyolefin fiber.

References Cited

UNITED STATES PATENTS

| 2,639,282 | 5/1953 | Sprague et al. | 260—240.9 X |
| 3,120,520 | 2/1964 | Buell | 117—33.5 |
| 3,158,610 | 11/1964 | Buell | 117—33.5 |

FOREIGN PATENTS

| 578,303 | 6/1959 | Canada. |
| 669,402 | 4/1952 | Great Britain. |

WILLIAM D. MARTIN, *Primary Examiner.*

T. G. DAVIS, *Assistant Examiner.*